United States Patent [19]

Hirose et al.

[11] Patent Number: 4,832,092

[45] Date of Patent: May 23, 1989

[54] WEIGHT-OPERATED FILLING SYSTEM OF ROTARY TYPE

[75] Inventors: Hideaki Hirose; Shigeru Yoshida, both of Kanazawa; Toru Kohashi, Akashi, all of Japan

[73] Assignees: Shibuya Kogya Co., Ltd., Ishibawa; Yamato Scale Co., Ltd., Kyogo, both of Japan

[21] Appl. No.: 83,572

[22] Filed: Aug. 7, 1987

[30] Foreign Application Priority Data

Aug. 20, 1986 [JP] Japan ................................ 61-194151

[51] Int. Cl.$^4$ .......................... B65B 1/04; B65B 3/26; G01G 3/08; G01G 13/02

[52] U.S. Cl. .......................................... 141/1; 141/83; 177/122; 177/229

[58] Field of Search ................. 141/83, 1; 177/25, 63, 177/64, 116, 122, 211, 229

[56] References Cited

U.S. PATENT DOCUMENTS

| | | | |
|---|---|---|---|
| 3,785,412 | 1/1974 | Stone | 141/83 |
| 4,060,109 | 11/1977 | Sotoma | 141/83 |
| 4,453,575 | 6/1984 | Del Rosso | 177/122 X |
| 4,509,610 | 4/1985 | Hayashi | 177/211 |
| 4,690,230 | 9/1987 | Uchimura et al. | 177/211 X |
| 4,703,780 | 11/1987 | Reeves, Jr. et al. | 177/122 X |
| 4,718,287 | 1/1988 | Mishliborsky | 177/211 X |

FOREIGN PATENT DOCUMENTS

| | | | |
|---|---|---|---|
| 52546 | 5/1982 | European Pat. Off. | 141/83 |
| 57-111417 | 7/1982 | Japan . | |

*Primary Examiner*—J. R. Scott

*Attorney, Agent, or Firm*—Flynn, Thiel, Boutell & Tanis

[57] ABSTRACT

A weight-operated filling system of rotary type is disclosed which is adapted to detect the weight of a vessel and content thereof by means of Roberval weigher. In such system, the centrifugal force which is applied to the vessel and the content thereof causes a metering error, and accordingly the invention provides a rotation detector which detects the rotation of a rotatable member in which Roberval weigher is mounted. A detection signal from the detector is used to correct for the error to derive a true weight. A filling valve is closed to terminate the filling operation when the true weight reaches a given value.

8 Claims, 2 Drawing Sheets

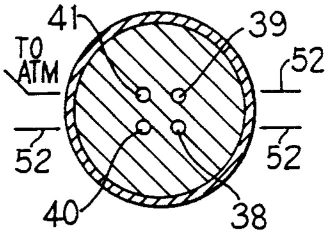
FIG. 2A
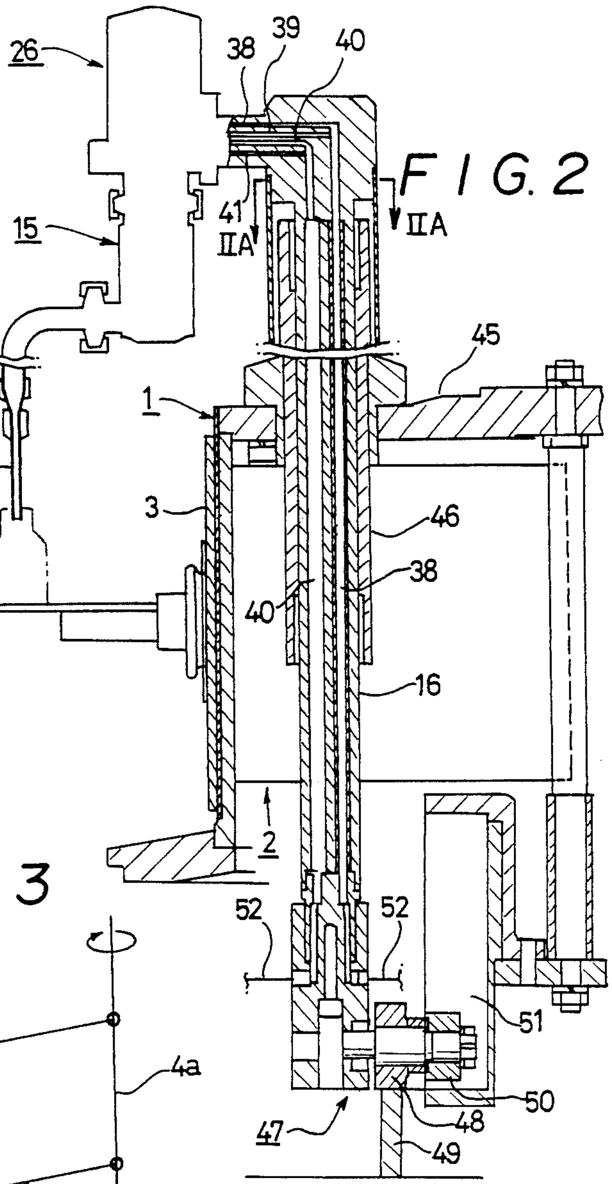
FIG. 2
FIG. 3
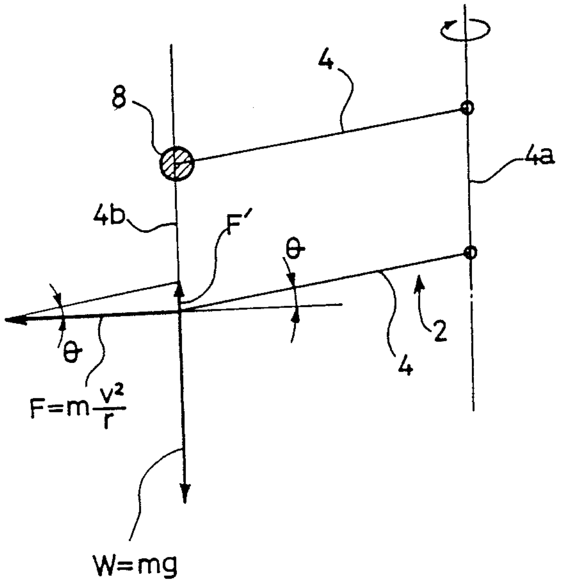

WEIGHT-OPERATED FILLING SYSTEM OF ROTARY TYPE

FIELD OF THE INVENTION

The invention relates to a weight-operated filling system of rotary type in which a filling operation is completed when a weight being determined by a weigher reaches a given value, and more particularly, to a weight-operated filling system of rotary type which employs a Roberval weigher.

DESCRIPTION OF THE PRIOR ART

A weight-operated filling system of rotary type which employs a Roberval weigher is known (see Japanese Laid-Open Patent Application No. 111,417/1982). Such system comprises a rotatable member which is driven for rotation in one direction, a Roberval weigher including a horizontally disposed beam having its one end connected to the rotatable member and having its other or free end connected to a support table on which a vessel is supported, a filling valve disposed above the support table for filling a content into a vessel as it is supplied onto the support table, and a controller responsive to a metering signal from the Roberval weigher to control the opening and closing of the filling valve. When the weight determined by the Roberval weigher reaches a given value, the controller closes the valve.

In the prior art construction, in order to facilitate the assembly of the Roberval weigher into the weight-operated filling system, the horizontally disposed beam is normally arranged so as to be aligned with the radial direction of the rotatable member, with the radially inner end of the beam secured to the rotatable member and the other or radially outer end connected to the support table.

It is recognized that the Roberval weigher is capable of achieving a higher precision of metering as compared with other weighers, and accordingly, when an ordinary content is to be filled, the arrangement of the weigher has not been a problem. However, when filling a certain content such as medicine which requires a filling of a closely controlled weight thereof, it is found that the arrangement described above results in the weight being determined to be a slightly less value than the actual value because of the centrifugal force having an upwardly directed component which is exerted upon the vessel on the support table and the content therein. It is also found that the upwardly directed component of the centrifugal force varies with the number of revolutions, per unit time, of the rotatable member, causing a variation in the weight of a content which is filled.

SUMMARY OF THE INVENTION

In view of the disadvantage described above, it is an object of the invention to provide a correction of the upwardly directed component of the centrifugal force which is exerted upon a Roberval weigher to provide a true weight, thereby allowing a content of reliably given weight to be filled.

To this end, in accordance with the invention, a rotation detector is provided for detecting the rotation of the rotatable member, and the detection signal from the detector is fed to the controller. Based on a metering signal from the Roberval weigher and the detection signal from the rotation detector, the controller operates to correct the weight determined by the Roberval weigher for an upwardly directed component of the centrifugal force which is exerted upon the vessel and the content to derive a true weight. When the true weight reaches a given value, the filling valve is closed.

With the described arrangement, any upwardly directed component of the centrifugal force which is exerted upon the vessel and the content to cause the determination of a weight to be less than the actual weight can be corrected for, allowing the filling valve to be closed on the basis of the true weight. In this manner, a content of a given weight can be reliably filled into the vessel independently from a variation in the number of revolutions of the rotatable member.

Above and other objects, features and advantages of the invention will become apparent from the following description of an embodiment thereof with reference to the drawings.

BRIEF DESCRIPTION OF THE DRAWINGS

FIG. 2 is a cross section taken through a different plane from that of FIG. 1;

FIG. 2A is a cross-sectional view substantially as taken on the line IIA—IIA of FIG. 1; and FIG. 3 is a schematic illustration of an upwardly directed component of the centrifugal force which is exerted upon a Roberval weigher.

DETAILED DESCRIPTION OF EMBODIMENT

Figure 1:
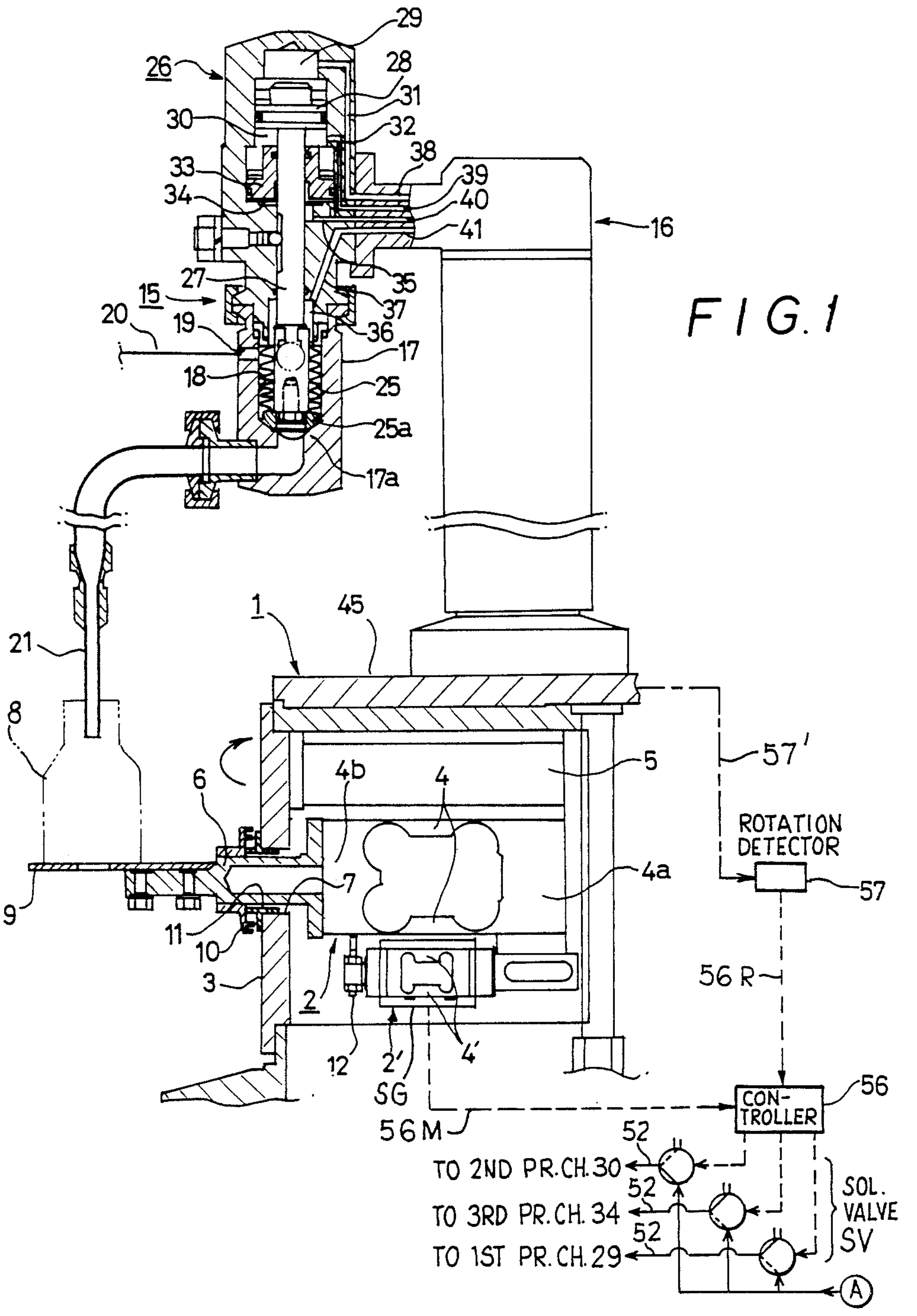
FIG. 1 is a cross section of one embodiment of the invention.

Referring to the drawings, and specifically, FIG. 1, a weight-operated filling system of rotary type includes a cylindrical rotatable member 1 which is mounted on a vertical spindle, not shown, and which is driven for rotation in one direction. The rotatable member 1 internally houses a plurality of Roberval weighers (parallelogram-shaped weigher) 2.

A plurality of Roberval weighers 2 are disposed close to the outer peripheral wall 3 of the rotatable member 1 at an equal interval around the circumference thereof. Each weigher 2 includes a horizontally disposed beam 4 which is disposed to be aligned with the radial direction of the rotatable member 1, with a radially inner end **4*a* of the beam 4 secured to the rotatable member 1 through a support member 5 which is in turn fixedly mounted on the outer peripheral wall 3**.

Each beam has a radially outer end or free end **4*b*, to which a connecting member 6 is attached. The connecting member 6 freely passes through an opening 7 formed in the wall 3, with its free end projecting externally of the rotatable member 1. A support table 9 which supports a vessel 8 thereon is connected to the projecting end of the connecting member 6 so as to be horizontally opposite to the Roberval weigher 2 with the outer wall 3 of the rotatable member 1 interposed therebetween. Labyrinth members 10, 11 are mounted on the connecting member 6 and in the opening 7 to provide as much isolation between the interior and the exterior of the rotatable member 1** as possible.

As is well known in the art, the Roberval weigher 2 basically comprises a strain gauge mounted on the beam 4 and operating to detect the weight which is applied to the free end **4*b* thereof. In the Roberval weigher 2 used in the present embodiment, a second Roberval weigher 2' of an identical construction, but of a reduced size, is disposed below the beam 4, and an adjusting bolt 12 is mounted on the free end of its beam 4' so as to be mechanically interlocked with the free end 4*b* of the beam 4. When the free end 4***b* of the beam 4 is displaced downward, such displacement is transmitted through the adjusting bolt 12 to cause a downward displacement of the beam 4' of the second weigher 2', thereby allowing a strain gauge, generally indicated at SG in FIG. 1, which is mounted on the beam 4', to detect the weight which is applied to the free end 4*b* of the beam 4.

A filling valve 15 is disposed above each of the support tables 9 for filling with a liquid content a vessel 8 which rests on the support table 9. Each filling valve 15 is mounted on the top end of an elevating member 16 which is elevatably mounted on the rotatable member 1, and is driven up and down by an elevating mechanism received within the rotatable member 1 as will be described later.

Each filling valve 15 includes a valve housing 17 which is formed with a filling passage 18 in its axially lower end, the top end of the passage 18 communicating with a tank, not shown, containing a supply of liquid to be filled, through a radial bore 19 and a flexible conduit 20 connected thereto. The bottom end of the passage 18 communicates with a filling nozzle 21 which is mounted on the valve housing 17.

The valve housing 17 houses a valve 25 therein comprising cylindrical bellows having a closed bottom. The valve 25 is connected to a piston rod 27 of a cylinder unit 26 so that when the piston rod 27 is caused to move down, a valve element 25*a* formed on the bottom of the valve is caused to be seated upon a valve seat 17*a* formed in the valve housing 17, thus closing the filling passage 18.

The upper end of the piston rod 27 is defined with a piston 28 of the cylinder unit 26, above which a first pressure chamber 29 is defined and below which a second pressure chamber 30 is defined. The valve housing 17 is formed with a first supply path 31 through which compressed air may be supplied to the first pressure chamber 29 to cause the piston 28 and the piston rod 27 to move down, threby causing the valve element 25*a* to be seated upon the valve seat 17*a* and to close the filling passage 18.

The valve housing 17 is also formed with a second supply path 32 through which compressed air may be supplied to the second pressure chamber 30, thereby causing the piston 28 and the piston rod 27 to be driven upward to move the valve element 25*a* away from the valve seat *27a*, thus opening the filling passage 18.

A second piston 33 is elevatably fitted into the valve housing 17 at a location below the piston 28, with the piston rod 27 slidably extending through the shank portion of the second piston 33. The second piston 33 is of a greater diameter than the piston 28, and the second pressure chamber 30 is defined above the second piston while a third pressure chamber 34 is defined below the second piston 33.

Accordingly, when compressed air is supplied into the second pressure chamber 30 of the cylinder unit 26, the second piston 33 is located at its down end to permit the upward movement of the piston 28. The filling passage 18 is fully open under this condition. By contrast, when compressed air is supplied into the third pressure chamber 34 through a third supply path 35 formed in the valve housing 17 to bring the second piston 33 to its up end while simultaneously supplying compressed air to the first pressure chamber 29 to cause a downward movement of the piston 28, the free downward movement of the piston 28 is limited by abutment against the second piston 33 before the piston 28 reaches its down end, thus opening the valve 25 to a smaller opening of a given magnitude.

In addition to the supply paths 31, 32, 35, the valve housing 17 is also formed with an atmospheric path 37 which allows an atmospheric chamber 36, formed within the valve 25, to be open to the atmosphere, thus permitting variation in the volume of the chamber 36. The paths 31, 32, 35 and 37 communicate with corresponding paths 38 and 41 formed within the elevating member 16.

Referring to FIG. 2, the elevating member 16 slidably extends through a support pipe 46 which vertically extends through and is secured to the top wall 45 of the rotatable member 1 at a location intermediate adjacent the Roberval weighers 2, with its bottom end being mechanically coupled to the elevating mechanism 47 mentioned above which is received within the rotatable member 1.

In the embodiment shown, the elevating mechanism 47 comprises a cam mechanism. Specifically, the elevating mechanism 16 carries a first cam follower 48 on its lower end, which is disposed to be rollable around an annular stationary cam 49 which is secured to a machine frame. The elevating member 16 also carries a second cam follower 50 at its bottom which is disposed for engagement with a vertically extending cam groove 51 formed in the rotatable member 1, thus preventing the elevating member 16 from rotating.

Turning to the paths 38 to 41 formed inside the elevating member 16, the path 41 which communicates with the atmospheric chamber 36 opens to the atmosphere at the lower end of the elevating member 16 while the remaining paths 38 to 40 are connected to a source of compressed air through a respective flexible conduit 52 and a solenoid valve SV (FIG. 1).

As indicated by in FIG. 1, a metering signal from Roberval weigher 2' is fed (as indicated by the dotted line 56M) to a controller 56 which includes a microcomputer, and a detection signal from a rotation detector 57, such as an encoder which, as indicated by the chain line 57' in FIG. 1, detects the number of revolutions of the rotatable member 1, is also fed (as indicated by the broken line 56R) to the controller 56.

Referring to FIG. 3, given the combined mass M of the vessel 8 and the liquid therein, (which mass M is being metered by the Roberval weigher 2) and given the gravitational acceleration g, the total weight W is expressed as follows:

$$W=mg \qquad (1)$$

Given a centrifugal force F applied to the vessel 8, the radius Y of the center of the vessel 8 with respect to the center of rotation, and the rotational speed V of the vessel, the centrifugal force F is given by the equation (2) below. It should be understood that the rotational speed v of the vessel is derived from the number of revolutions of the rotatable member 1 per unit time.

$$F=mv^2/r \qquad (2)$$

When the weight W is applid to the free end 4*b* of the Roberval weigher 2' to cause the beam 4 to be inclined downwardly through an angle $\theta$, there is produced an upwardly directed component F' of the centrifugal force, which is given by the following equation:

$$F'=F\cdot\tan\theta=mv^2\cdot\tan\theta/r \qquad (3)$$

It will be noted that the value of tan $\theta$ is derived from the flatness response of the Roberval weigher 2'.

It will be understood from an inspection of FIG. 3 that the detected weight W' which is obtained from the Roberval weigher 2' represents the true weight W from which the upwardly directed component F' of the centrifugal force is subtracted, with the component F' varying with the rotational speed v, or the number of revolutions per unit time, of the rotatable member 1.

Accordingly, by using the controller 56 which includes the microcomputer, the magnitude of the upwardly directed component F' of the centrifugal force applied to the vessel 8 and the content thereof may be calculated and added to the detected weight W' determined by the Roberval weigher 2' to obtain the true weight W on the basis of the detection signal from the detector 57 and the metering signal from the weigher 2'.

The controller 56 may operate to derive the true weight W in accordance with the equations given above each time signals are fed from Roberval weigher 2' and the rotation detector 57. Alternately, to reduce the time length required for the calculation, a table may be previously formulated in which the detected weight W' is taken on the ordinate while the number of revolutions of the rotatable member 1 is taken on the abscissa so that the component F' or the true weight W may be obtained at a particular combination of both coordinates. Such table may be stored in a memory of the microcomputer. With this arrangement, whenever the metering signal from the weigher 2' and the detection signal from the detector 57 are entered, the component F' or the true weight W can be directly obtained from the table.

In operation, when an empty vessel 8 is supplied onto the support table 9 from a supply starwheel, not shown, which rotates in synchronism with the rotatable member 1 under the condition that the filling valve 15 is located at its up end (not shown) and the valve 25 (FIG. 1) is closed, the controller 56 stores the true weight of the empty vessel 8 in response to input signals from the Roberval weigher 2' and the rotation detector 57 as indicated 56M and 56R respectively. At the same time, the elevating member 16 (FIG. 2) and the filling valve 15 are moved down by the cam profile of the stationary cam 49, thus inserting the lower end of the filling nozzle 21 into the vessel 8.

It is to be noted that the controller 56 has an indication of the angular position of rotation of the rotatable member 1 as a result of an input at 56R (FIG. 1) from the rotational detector 57 or some other detector, not shown, and when it detects that the rotatable member 1 has rotated to a particular angular position where the lower end of the filling nozzle 21 is inserted into the vessel 8, it operates to open a solenoid valve, schematically indicated at SV in FIG. 1, to supply compressed air into the second pressure chamber 30 (FIG. 1) to open the valve 25 fully, thereby supplying the liquid within the tank through the conduit 20, the radial bore 19, the filling passage 18 and the filling nozzle 21 to fill the vessel 8.

When the weight reaches a predetermined value as the liquid filling operation into the vessel 8 proceeds, the controller 56 switches the above described solenoid valve SV, thereby supplying compressed air to the first pressure chamber 29 and the third pressure chamber 34 simultaneously. Thereupon, the opening of the valve 25 is reduced, whereby the liquid will be filled in small increments. When the controller 56 detects via path 56M that the given weight is reached, it supplies compressed air to only the first pressure chamber 29, thus closing the valve 25.

At this time, it will be noted that the valve 25 is closed by the controller 56 supplying compressed air to only the first pressure chamber 29 when the combined weight of the vessel 8 and the content thereof from which the weight of the empty vessel 8, previously obtained, is subtracted or the true weight of the filling liquid alone is determined to be equal to a given value on the basis of input signals from Roberval weigher 2' and the rotation detector 57. Accordingly, it is assured that a given weight of liquid content can be filled into the vessel 8 independently from any variation in the number of revolutions of the rotatable member 1 or a variation in the weight of the vessel 8.

In the present embodiment, Roberval weigher 2 and the support table 9 are substantially aligned with each other in the horizontal direction on the opposite side of the peripheral wall 3 of the rotatable member 1, and the support table 9 and the Roberval weigher 2 are connected together through the connecting member 6 which extends through the opening 7 formed in the wall 3. Accordingly, if the filling liquid happens to spill from the filling valve 15 located above the support table 9, the likelihood that such filling liquid passes through the opening 7 to contaminate Roberval weigher 2 is considerably reduced over a prior art arrangement in which the opening extends vertically through the top wall.

In the present embodiment, the paths 31, 32, 35 and 37 which supply the operating pressure or the atmospheric pressure to the cylinder unit 26 extend into the rotatable member 1, serving as a main housing, through the pathes 38 to 41 which are formed within the elevating member 16, and then communicate to a pressure source such as a source of compressed air through the conduits 52 from within the rotatable member 1, thus dispensing with the use of exposed conduits outside the rotatable member which would be required when the cylinder unit 26 is directly connected with flexible conduits.

This eliminates the need to rinse the conduits, in addition, even though the filling valve 15 and the cylinder unit 26 are integrally assembled together, the filling valve 15 and the cylinder unit 26 may be rinsed by merely detaching them from the elevating member 16 without requiring a dismounting of conduit from the cylinder unit as was conventional in the prior art, thus improving the rinsing operation.

It is to be noted that a variety of configurations may be employed for the controller 56. In one form, the true weight may be determined each time Roberval weigher 2 provides a detected weight, and the filling operation may be terminated when the true weight reaches a given value. In another form, a correction value may be previously calculated on the basis of the given value of the true weight and the number of revolutions of the rotatable member 1, and may be added to the detected weight from the Roberval weigher 2 and the filling operation may be terminated when the sum reaches the given value. In a further form, the correction value may be subtracted from the predetermined value of the true weight to derive a value for the detected weight, the detection of which by Roberval weigher 2 terminates the filling operation.

In the described embodiment, the controller 56 comprises a single unit, but it should be noted that a suitable arrangement may be used depending on the processing speed and the cost requirement. By way of example, a plurality of controllers may be used to control one or more valves 25. Alternatively, the controller disclosed may comprise a main controller and a plurality of sub-controllers, each of which is associated with the Roberval weigher 2, such that the individual sub-controller determines the true weight W for each associated weigher 2 while the main controller controls the opening of the individual valve 25 in response to signals detected from the sub-controllers.

While the invention has been illustrated and described above in connection with an embodiment thereof, it should be understood that a number of changes, substitutions and modifications will readily occur to one skilled in the art from the above disclosure without departing from the spirt and scope of the invention defined by the appended claims.

What is claimed is:

1. A weight-operated filling system of rotary type, comprising a rotatable member which is driven for rotation in one direction, a horizontally disposed Roberval weigher which has one end connected to the rotatable member and a free end carrying a support table on which a vessel is carried, a filling valve disposed above the support table for filling a vessel on the support table with a content, and a controller receiving a metering signal from the Roberval weigher and controlling the opening and closing of the filling valve;

the system further comprising a rotational detector responsive to the rotation of the rotatable member for producing a detection signal, means feeding said detection signal from the rotational detector to the controller for deriving a true weight of the vessel and its content by correcting the weight determined by the Roberval weigher for an upwardly directed component of the csentrifugal force applied to the vessel and its content as a result of the rotation of the rotatable member and support table, and means responsive to the controller for closing the filling valve when the true weight reaches a given value.

2. A weight-operated filling system according to claim 1 in which the support table is disposed outside the rotatable member while the Roberval weigher is disposed inside the rotatable member so that the support table and the Roberval weigher are located substantially opposite to each other with the peripheral wall of the rotatable member interposed therebetween, the peripheral wall being formed with an opening extending therethrough and through which a connecting member extends to connect the support table with the Roberval weigher.

3. A weight-operated filling system according to claim 2 in which a second Roberval weigher of a reduced size is disposed below the first mentioned said Roberval weigher, the second Roberval weigher including a horizontally disposed beam having its one end connected to the rotatable member and having its other, free end mechanically coupled to the first mentioned Roberval weigher which is disposed thereabove, the second Roberval weigher being effective to detect a weight which is applied to the support table that is connected to the first mentioned Roberval weigher.

4. A weight-operated filling system according to claim 1, further including an elevating member disposed elevatably on the rotatable member, said filling valve being mounted on the elevating member outside the rotatable member, and a cylinder unit mechanically coupled with the filling system for opening and closing the filling valve, and an elevating mechanism for moving the elevating member up and down, a supply path which supplies an operating pressure to the cylinder unit being formed within the elevating member and extending into the rotatable member, and means connecting said supply path to a source of pressure.

5. A method for operating a weight-operated filling system of the rotary type including a rotatable member which is driven for rotation in one direction, a horizontally disposed Roberval weigher which has its one end connected to the rotatable member and its free end carrying a support table on which a vessel is to be carried for rotation with said rotatable member, a filling valve disposed above the support table for filling a vessel on the support table with a content; the method comprising the steps:

detecting the rotation speed of the rotatable member with a rotational detector;

detecting the apparent weight of the vessel and its content with a Roberval weigher;

deriving a true weight of the vessel and its content by correcting the apparent weight determined by the Roberval weigher for an upwardly directed component of the centrifugal force which is applied to the vessel and its content as a result of said rotation with said rotatable member; and closing the filling valve when the true weight reaches a given value.

6. A method according to claim 5 in which the system includes a controller incorporating a microcomputer, the method including the further steps of:

feeding an apparent weight metering signal from the Roberval weigher and a rotation speed detection signal from the detector to the controller; and carrying out said deriving of said true weight with the aid of said controller.

7. A method according to claim 6 including:

storing in the controller a series of correction values (F') for a given value of the true weight and several different numbers of revolutions per unit time of the rotatable member; and adding that one of the stored correction values (F'), which corresponds to a measured number of revolutions per unit time, to the detected weight from the Roberval weigher to derive said true weight.

8. A method according to claim 7 including calculating with the controller the correction values in accordance with said given value of the true weight and said several different numbers of revolutions per unit time of the rotatable member, storing with the controller a particular value of detected weight which corresponds to the given value of the true weight by subtracting a selected said correction value from such given value of true weight; and terminating a vessel filling operation when the detected signal from the Roberval weigher reaches said particular value of detected weight.

* * * * *

UNITED STATES PATENT AND TRADEMARK OFFICE
CERTIFICATE OF CORRECTION

PATENT NO. : 4,832,092

DATED : May 23, 1989

INVENTOR(S) : Hideaki Hirose et al

It is certified that error appears in the above-identified patent and that said Letters Patent is hereby corrected as shown below:

Col. 7, lines 36 & 37; change "csentrifugal force" to --centrifugal force--.

Signed and Sealed this

Twenty-sixth Day of September, 1989

*Attest:*

DONALD J. QUIGG

*Attesting Officer*

*Commissioner of Patents and Trademarks*

UNITED STATES PATENT AND TRADEMARK OFFICE
CERTIFICATE OF CORRECTION

PATENT NO. : 4 832 092

DATED : May 23, 1989

INVENTOR(S) : Hideaki Hirose et al.

It is certified that error appears in the above-identified patent and that said Letters Patent is hereby corrected as shown below:

ON THE FACE OF THE PATENT:

No. 73 ASSIGNEES; change "Shibuya Kogya Co., Ltd. of Ishibawa, Japan" to ---Shibuya Kogyo Co., Ltd. of Ishikawa, Japan ---.

change "Yamato Scale Co., Ltd. of Kyogo, Japan" to ---Yamato Scale Co., Ltd. of Hyogo, Japan---.

Signed and Sealed this

Seventeenth Day of July, 1990

*Attest:*

HARRY F. MANBECK, JR.

*Attesting Officer* *Commissioner of Patents and Trademarks*